United States Patent
Lee et al.

(10) Patent No.: US 9,484,607 B2
(45) Date of Patent: Nov. 1, 2016

(54) BATTERY MODULE

(71) Applicant: SAMSUNG SDI CO., LTD., Yongin-si, Gyeonggi-do (KR)

(72) Inventors: Jang-Wook Lee, Yongin-si (KR); Jang-Yeong Im, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 41 days.

(21) Appl. No.: 14/328,445

(22) Filed: Jul. 10, 2014

(65) Prior Publication Data

US 2015/0037631 A1    Feb. 5, 2015

Related U.S. Application Data (60) Provisional application No. 61/862,202, filed on Aug. 5, 2013.

(51) Int. Cl.

| | |
|---|---|
| *H01M 10/613* | (2014.01) |
| *H01M 10/6557* | (2014.01) |
| *H01M 10/656* | (2014.01) |
| *H01M 2/10* | (2006.01) |
| *H01M 2/14* | (2006.01) |
| *H01M 10/625* | (2014.01) |
| *H01M 10/647* | (2014.01) |

(52) U.S. Cl.
CPC ......... *H01M 10/613* (2015.04); *H01M 2/1077* (2013.01); *H01M 2/14* (2013.01); *H01M 10/625* (2015.04); *H01M 10/647* (2015.04); *H01M 10/656* (2015.04); *H01M 10/6557* (2015.04); *H01M 2220/20* (2013.01)

(58) Field of Classification Search
CPC ........... H01M 10/613; H01M 10/625; H01M 10/647; H01M 10/6557; H01M 10/656; H01M 2220/20; H01M 2/1077; H01M 2/14
See application file for complete search history.

(56) References Cited

U.S. PATENT DOCUMENTS

| | | | |
|---|---|---|---|
| 8,268,474 B2 * | 9/2012 | Kim | H01M 2/1016 429/149 |
| 2011/0064993 A1 | 3/2011 | Ochi | |
| 2012/0315519 A1* | 12/2012 | Jin | H01M 10/625 429/72 |
| 2013/0034755 A1 | 2/2013 | Kim | |

FOREIGN PATENT DOCUMENTS

| | | |
|---|---|---|
| DE | 10-2011-104-499 A1 | 12/2012 |
| KR | 10-2013-0011370 A | 1/2013 |
| KR | 10-2013-0015115 A | 2/2013 |

OTHER PUBLICATIONS

Search Report mailed Feb. 16, 2015 in corresponding European Patent Application No. 14179799.3.

* cited by examiner

*Primary Examiner* — Jane Rhee
(74) *Attorney, Agent, or Firm* — Lee & Morse, P.C.

(57) ABSTRACT

A battery module includes a first battery cell, a first barrier, and a second barrier, the first battery cell being between the first barrier and the second barrier, wherein a first opening is in flow communication with a first space defined between a first side of the first battery cell and a first side portion formed by at least one of the first and second barriers, the first space being in flow communication with a second space defined between a second side of the first battery cell and a second side portion formed by at least one of the first and second barriers.

17 Claims, 6 Drawing Sheets

BATTERY MODULE

CROSS-REFERENCE TO RELATED APPLICATION

The present application claims priority under 35 U.S.C. §119 to U.S. Provisional Application No. 61/862202, filed on Aug. 5, 2013, and entitled: "Battery Module," which is incorporated herein by reference in its entirety.

BACKGROUND

1. Field

Embodiments relate to a battery module.

2. Description of the Related Art

A high-power battery module using a non-aqueous electrolyte with high energy density may be configured as a large-capacity battery module manufactured by connecting a plurality of battery cells in series so as to be used for driving devices, e.g., motors of electric vehicles and the like, which require high power.

SUMMARY

Embodiments are directed to a battery module, including a first battery cell, a first barrier, and a second barrier, the first battery cell being between the first barrier and the second barrier, wherein a first opening is in flow communication with a first space defined between a first side of the first battery cell and a first side portion formed by at least one of the first and second barriers, the first space being in flow communication with a second space defined between a second side of the first battery cell and a second side portion formed by at least one of the first and second barriers.

The second space may be in flow communication with a third space defined between a third side of the first battery cell and a third side portion formed by at least one of the first and second barriers.

The first and second barriers may each include a base portion, and bottom and side flange portions extending from bottom and side edges of the base portion.

The first side portion may include the side flange portion of one of the first and second barriers, and the second side portion may include the bottom flange portion of one of the first and second barriers.

The second side portion may be formed by the base portion of the one of the first and second barriers and the bottom flange portion of the other of the first and second barriers, the first opening may expose a first side of the first battery cell, and the second space may be in flow communication with a second opening at a third side of the first battery cell.

The battery module may be configured to pass a heat exchange medium from the first opening to the second opening.

The bottom flange portion may include one or more guide portions configured to guide a heat exchange medium.

The battery module may further include a second battery cell and a third barrier, the second battery cell being between the first barrier and the third barrier. The base portion of the first barrier may be interposed between the first battery cell and the second battery cell.

The side flange portions of at least one of the first and second barriers may include side ribs protruding toward the first battery cell.

The first opening may be formed in the side flange portion of one of the first and second barriers.

A second opening may be formed in another side flange portion of the one of the first and second barriers having the first opening formed therein.

At least one of the first and second barriers may include a support portion configured to support the first battery cell, the support portion defining at least part of the second space.

At least one of the first and second barriers may include a fastening portion coupling the first and second barriers together.

The fastening portion may include a protecting member that connects with an adjacent barrier.

The fastening portion may be disposed at an upper portion of the barriers.

The fastening portion may include a body portion having a projecting member and a fastening groove, the projecting member projecting from a first side of the body portion, the fastening groove being provided at an opposite side of the body portion.

The projecting member of one of the first and second barriers may be coupled with the fastening groove of the other of the first and second barriers.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art. In the drawing figures, the dimensions of layers and regions may be exaggerated for clarity of illustration. Like reference numerals refer to like elements throughout.

When an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween.

Figure 1:
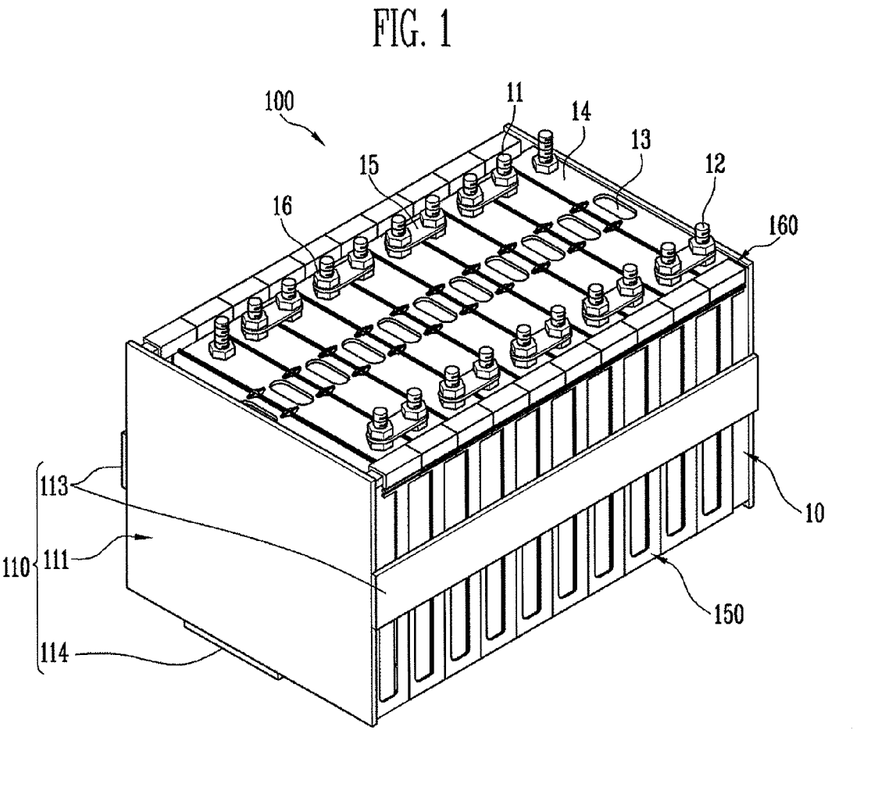
FIG. 1 illustrates a perspective view showing a battery module according to an example embodiment.

FIG. 1 illustrates a perspective view showing a battery module according to an example embodiment.

Referring to FIG. 1, the battery module 100 according to the present example embodiment includes a plurality of battery cells 10 aligned in a first direction, barriers 150 respectively interposed between the plurality of battery cells 10, and a housing 110 configured to accommodate the battery cells 10 and the barriers 150 therein.

The barriers 150 may include one or more fastening portions 160 configured to couple adjacent barriers 150 together.

The barriers 150 may include one or more support portions 155 (see FIG. 2) configured to form a flow path of a heat exchange medium beneath the battery cell 10.

The plurality of battery cells 10 may be aligned in the first direction with wide surfaces of the battery cells 10 facing each other.

The battery cell 10 may be manufactured by accommodating an electrode assembly and an electrolyte in a battery case and then sealing the battery case with a cap assembly 14. The cap assembly 14 may include a positive electrode terminal 11, a negative electrode terminal 12, and a vent portion 13. The electrode assembly may be electrically connected to the positive and negative electrode terminals 11 and 12, and the positive and negative electrode terminals 11 and 12 may convey energy generated by an electrochemical reaction between the electrode assembly and the electrolyte. Gas may be generated inside the battery cell 10 due to a side reaction of the electrochemical reaction. The vent portion 13 may act as a passage through which the gas generated inside the battery cell 10 is exhausted to the outside of the battery cell. 10.

In the present example embodiment, the positive and negative electrode terminals of two battery cells 10 adjacent to each other may be electrically connected by a bus-bar 15. The bus-bar 15 may be provided with holes through which the positive and negative electrode terminals 11 and 12 can pass, respectively. The bus-bar 15 connected to the positive and negative electrode terminals 11 and 12 passing through the respective holes thereof may be fixed by a nut 16 or the like.

In the present example embodiment, the housing 110 fixes together the plurality of battery cells 10 and the barriers 150 respectively interposed between the battery cells 10, and the plurality of battery cells 10 may act as one power source. The housing 110 may include a pair of end plates 111 disposed to face wide surfaces of the outermost battery cells 10, and connection members 113 and 114 configured to connect the end plates 111 to each other. The connection members 113 and 114 may be provided to support bottom and side surfaces of the battery cells 10.

Figure 2:
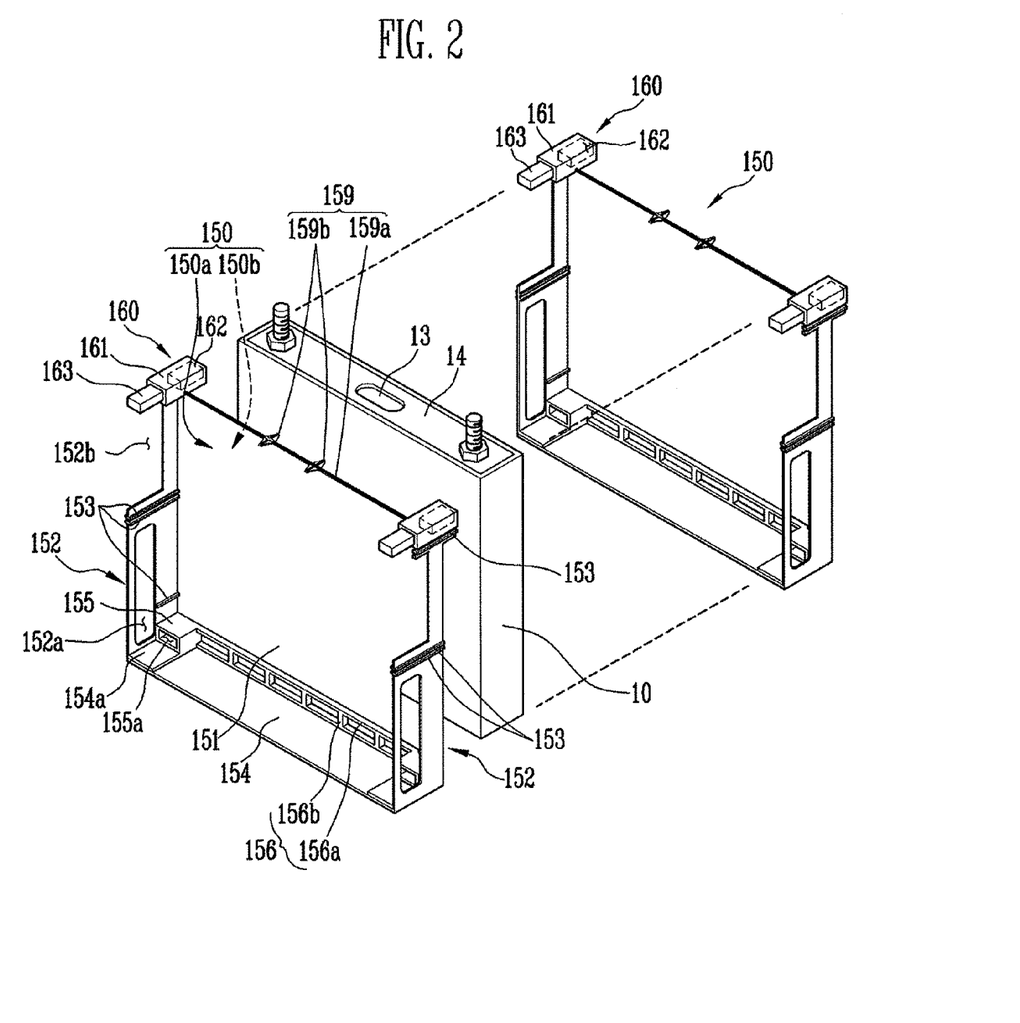
FIG. 2 illustrates a perspective view of a battery cell and barriers, shown in FIG. 1.

FIG. 2 illustrates a perspective view of a battery cell and barriers, shown in FIG. 1.

Referring to FIG. 2, the barrier 150 may include a base portion 151 disposed in parallel to a wide surface of the battery cell 10, and one or more flange portions 152, 154, and 159 provided to face side surfaces of the battery cell 10 at corners of the base portion 151. The barrier 150 may include one surface 150a configured to face any one of a pair of adjacent battery cells 10, and another surface 150b configured to face the other of the pair of adjacent battery cells 10. The one surface 150a and the other surface 150b may be formed in different shapes. For example, the battery cell 10 may be interposed between adjacent barriers 150, and the one surface 150a of the barrier 150 facing a front surface of the battery cell 10 and the other surface 150b of the barrier 150 facing a rear surface of the battery cell 10 may be formed in different shapes. For example, the one surface 150a and the other surface 150b of the barrier 150 may be formed in shapes configured to engage with each other.

A fastening portion 160 may be provided through which adjacent barriers 150 are fastened to each other. The fastening portion 160 may include a body portion 161 at a corner of the base portion 151, a fastening projection 163 provided at one end of the body portion 161 to protrude outward, and a fastening groove 162 provided at the other end of the body portion 161 to be concave inward. The barriers 150 adjacent to each other with the battery cell 10 interposed therebetween may be fastened and fixed by the fastening portion 160. For example, the fastening projection 163 may be provided to one of the adjacent barriers 150, and may be inserted into the fastening groove 162 of the other of the adjacent barriers 150 so that the adjacent barriers 150 can be fastened to each other. Multiple fastening portions may be provided for each pair of adjacent barriers 150.

According to the present example embodiment, the fastening groove 162 may be formed in a shape corresponding to the fastening projection 163. For example, with the fastening projection 163 inserted into the fastening groove 162, the body portions 161 of the fastening portions 160 provided to the adjacent barriers 150 may be aligned with each other, so that one end of the body portion 161 of one of the adjacent barriers 150 can be engaged with the other end of the body portion 161 of the other of the adjacent barriers 150. In a case where the barriers 150 are not aligned with each other, the body portions 161 of the fastening portions 160 may be disposed to cross each other, and the coupling between the fastening groove 162 and the fastening projection 163 of the adjacent barriers 150 may be difficult. This may help identify whether the positions of the adjacent barriers 150 are correctly aligned. Thus, the fastening portion 160 of the barrier 150 may fix an adjacent barrier 150 by being fastened to that of the adjacent barrier 150 and simultaneously guide the position of the adjacent barrier 150.

According to the present example embodiment, the barrier 150 may include a base portion 151 configured to correspond to a wide surface of the battery cell 10, and flange portions 152, 154, and 159 extending from the base portion 151 at corners of the base portion 151. The base portion 151 may be formed in a shape corresponding to the wide surface of the battery cell 10. For example, the base portion 151 may be formed larger than the wide surface of the battery cell 10. Although not shown in this figure, one or more projections that allow the wide surface of the battery cell 10 and the base portion 151 to be spaced apart from each other may be provided to the base portion 151. The flange portions 152, 154, and 159 may include two side flange portions 152 respectively provided at both side portions of the base portion 151, a bottom flange portion 154 provided at a bottom of the base portion 151, and a top flange portion 159 provided at a top of the base portion 151. The side and bottom flange portions may be formed as quadrangular flat plates.

The top flange portion 159 may be mounted on the cap plate 14 of the battery cell 10. The top flange portion 159 may be formed not to block the vent portion 13 formed in the cap plate 14. For example, the top flange portion 159 may include a rod-shaped member 159a provided along the longitudinal direction of the battery cell 10, and a protruding portion 159b protruded from the rod-shaped member 159a. The protruding portion 159a ma be formed corresponding to the shape of the vent portion 13 so that the vent portion 13 is exposed.

In the present example embodiment, an opening may expose a narrow side of the battery cell 10. The opening may be defined between adjacent barriers 150.

For example, an opening 152*a* and/or an opening 152*b* may be provided in the side flange portion 152. The battery module may be configured for a heat exchange medium to flow in the barrier 150 or flowed out of the barrier 150. The heat exchange medium is provided to perform a heat exchange with the battery cell 10. The heat exchange medium may be flowed in the barrier 150 through the openings 152*a*, 152*b* to perform a heat exchange with the battery cell 10 and then flowed out of the barrier 150 through opposite openings 152*a*, 152*b*. The openings 152*a*, 152*b* may include an upper opening 152*b* provided at an upper portion of the side flange portion 152, and a lower opening 152*a* provided at a lower portion of the side flange portion 152.

The upper opening 152*b* may be provided to have an area as wide as possible so that the heat exchange medium may smoothly flow in the barrier 150 or flowed out of the barrier 150 therethrough. For example, the upper opening 152*b* may formed in a shape where the other portions of the upper portion of the side flange portion 152, except a portion attached to the base portion 151, are all opened. The lower opening 152*a* may be provided to have a size smaller than that of the upper opening 152*b*. The lower opening 152*b* may act as a passage through which the heat exchange medium is flowed in the barrier 150. The lower opening 152*a* may act as a connection passage through which the heat exchange medium is transferred to a lower portion of the battery cell 10. The lower opening 152*a* may be provided to have a size smaller than that of the upper opening 152*b* so that the heat exchange medium flowed in the barrier 150 is not discharged through the lower opening 152*a* but is transferred to the lower portion of the battery cell 10. The lower opening 152*a* may be formed in the shape of a hole provided at an inner side of the side flange portion 152.

In the present example embodiment, the side flange portion 152 may be provided with one or more side ribs 153 protruded from the surface of the side flange portion 152. The side ribs 153 may be provided to protrude from the surface of the side flange portion 152. For example, the side ribs 153 may be provided at inner and outer portions of the side flange portion 152. The side rib 153 provided at the inner portion of the side flange portion 152 may help provide a flow path of the heat exchange medium by allowing the battery cell 10 and the side flange portion 152 to be spaced apart from each other. The side rib 153 provided at the outer portion of the flange portion 152 may help promote the flow of the heat exchange medium in the battery module by allowing the side flange portion 152 and the housing 113 (see FIG. 1) to be spaced apart from each other.

The side rib 153 may be provided between the lower and upper openings 152*a* and 152*b*. Thus, the side rib 153 may reinforce the physical strength of the side flange portion 152, which may be lowered by the lower and upper openings 152*a* and 152*b*. The side rib 153 may be provided to correspond to the lateral direction of the side flange portion 152. A plurality of side ribs 153 may be protruded, e.g., to extend in parallel with one another.

Support portions 155 configured to support the bottom surface of the battery cell 10 may be provided at a lower portion of the barrier 150. The support portions 155 may be respectively provided at one end and the other end of a lower portion of the base portion 151 so as to allow the bottom surface of the battery cell 10 and the lower portion of the base portion 151 to be spaced apart from each other. For example, support portion 155 may help provide a flow path of the heat exchange medium flowed in the barrier 150 through the openings 152*a* and 152*b* of the side flange portion 152, which may improve the cooling efficiency of the bottom surface of the battery cell 10.

In the present example embodiment, the battery module includes a plurality of battery cells 10. The battery cells 10 may generate heat by being repetitively charged/discharged, and such heat may accelerate degradation of the battery cells 10. In a serious case, the heat may cause a problem in the safety of the battery cell 10. Therefore, the heat may be controlled by cooling, e.g., using one or more of the openings 152*a* and 152*b* provided to the side flange portion 152 of the barrier 150. The openings 152*a*, 152*b* may act as passages through which the heat exchange medium (which is heat-exchanged (e.g., heated) with the battery cell 10) is flowed in the barrier 150 or flowed out of the barrier 150. According to the present example embodiment, the barrier 150 may be provided with the support portion 155, which may help provide the flow path of the heat exchange medium beneath the bottom surface of the battery cell 10. As such, heat exchange efficiency of the battery cell 10 may be enhanced. Further, according to the present example embodiment, the barrier 150 may be provided with the fastening portion 160 through which adjacent barriers 150 are fixed together, which may help maintain a constant space between the barrier 150 and the battery cell 10. This may help provide an efficient path through which the heat exchange medium flows. Accordingly, it may be possible to more effectively control the temperature of the battery cell 10 and extend the lifespan of the battery module 100.

Figure 3A:
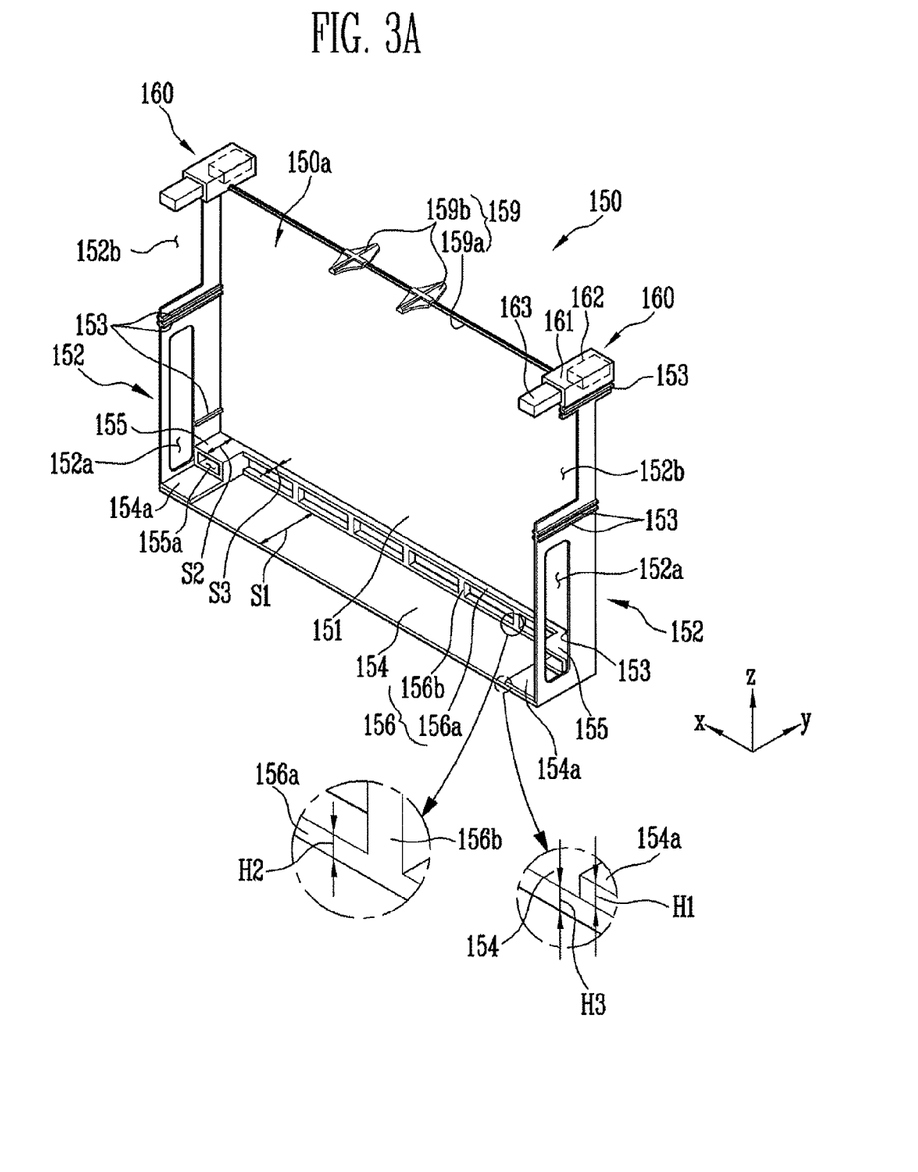
FIG. 3A illustrates a view showing one surface of the barrier of FIG. 2.
Figure 3B:
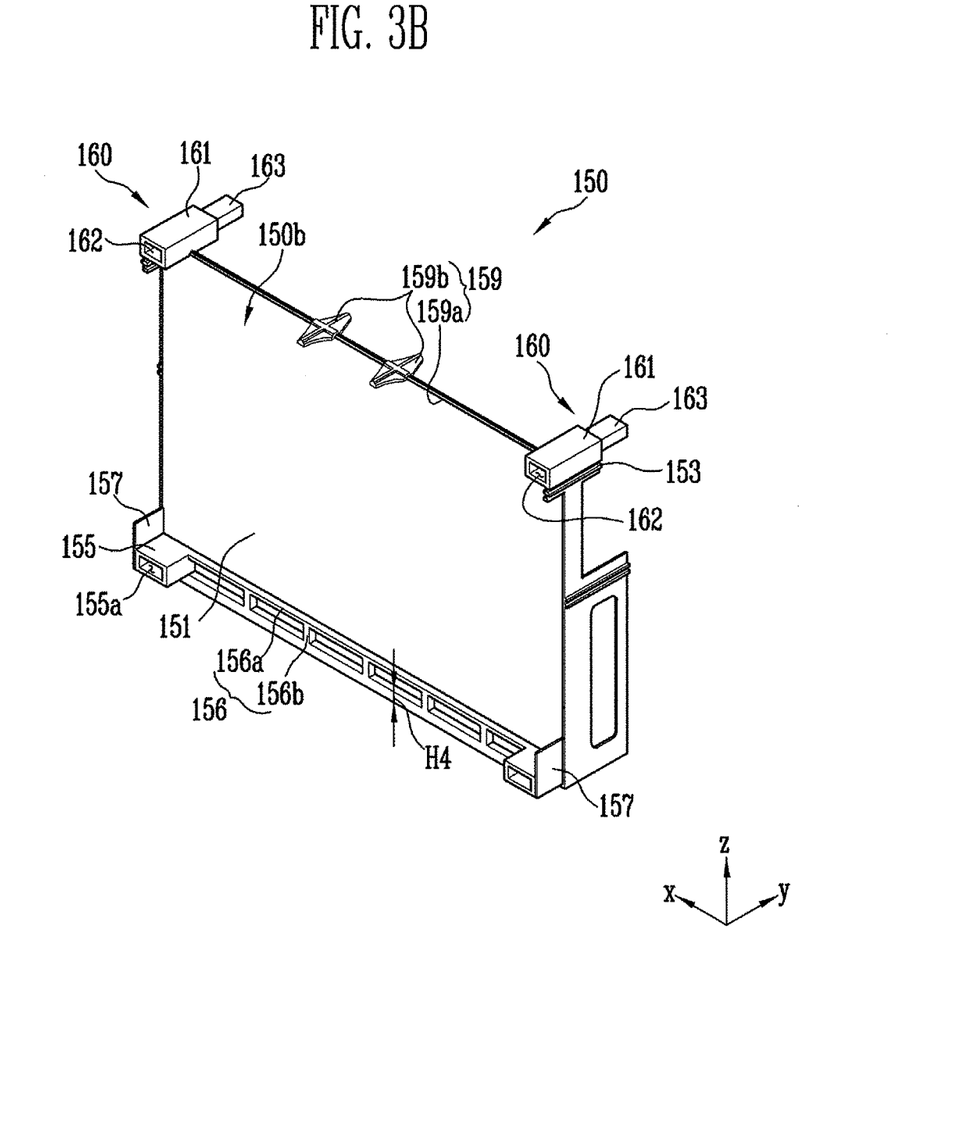
FIG. 3B illustrates a view showing the other surface of the barrier of FIG. 2.
Figure 4:
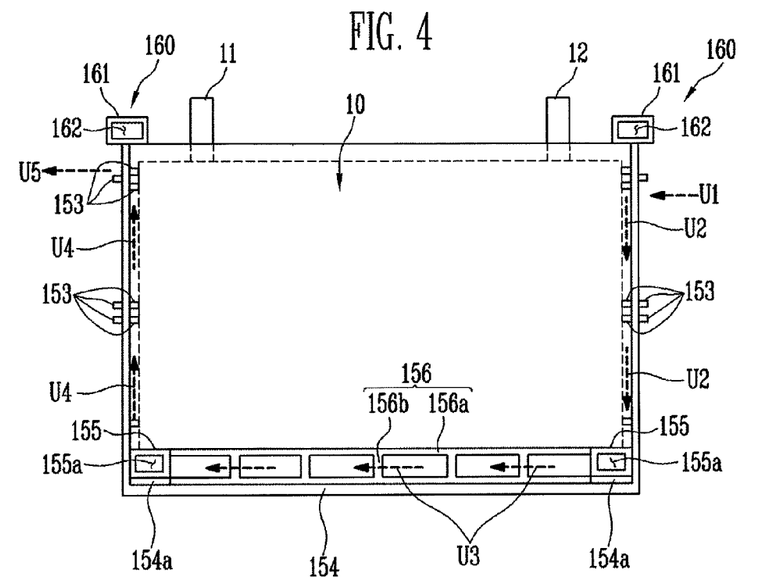
FIG. 4 illustrates a view schematically showing a front side of the barriers having the battery cell interposed therebetween.

FIG. 3A illustrates a view showing one surface of the barrier of FIG. 2. FIG. 3B illustrates a view showing the other (opposite) surface of the barrier of FIG. 2. FIG. 4 illustrates a view schematically showing a front side of the barriers having the battery cell interposed therebetween.

Referring to FIGS. 3A to 4, the support portions 155 may be provided at the lower portion of the barrier 150. The battery cell 10 may be mounted on the support portions 155, and the flow path of a heat exchange medium may be provided between the support portions 155 and the battery cell 10. For example, the support portion 155 may formed in the shape of a box having a hole 155*a* provided therein. Spacing members 154*a* and 157 may be respectively interposed between the support portion 155 and the side flange portion 152 and between the support portion 155 and the bottom flange portion 154. The spacing members 154*a* and 157 may include a bottom spacing member 154*a* provided between the support portion 155 and the bottom flange portion 154 at a bottom of the support portion, and a side spacing member 157 provided between the support portion 155 and the side flange portion 152 at a side of the support portion 155. The bottom spacing member 154*a* may be provided to the on surface 150*a* of the barrier 150, and the side spacing member 157 may be provided to the other surface 150*b* of the barrier 150. The bottom spacing member 154*a* may be extended along the bottom flange portion 154 from the base portion 151, and the side spacing member 157 may be extended along the side flange portion 152 from the base portion 151.

For example, in a case where adjacent barriers 150 are provided to correspond to each other, the one surface 150*a* of any one barrier (e.g., a first barrier) of the adjacent barriers 150 may face the other surface 150*b* of the other barrier (e.g., a second barrier) of the adjacent barriers 150 (see FIG. 2). The first and second barriers 150 may refer to barriers having the same shape, but for convenience of illustration, adjacent barriers 150 will be described as the first and second barriers 150. The support portion 155 provided to the other surface 150*b* of the second barrier 150 may be mounted on the bottom spacing member 154a provided to the one surface 150a of the first barrier 150. The side spacing member 157 provided to the other surface 150b of the second barrier 150 may be provided to come in contact with the side flange portion 152 of the first barrier 150.

The bottom flange portion 154 may provided to the one surface 150a of the first barrier 150. The bottom flange portion may be formed to protrude little from the other surface 150b of the second barrier 150, or may not be provided to the other surface 150b of the second barrier 150. In this case, the support portion 155 provided to the other surface 150b of the second barrier 150 may be spaced apart from a bottom end of the base portion 151 at a predetermined distance. The spaced distance may correspond to the sum of the thickness H1 of the bottom spacing member 154a and the thickness H3 of the bottom flange portion 154 on the one surface of the first barrier 150. The sum of the thickness H2 of a lower first connection rib 156a of first connection ribs 156a (described below) and the thickness H1 of the bottom spacing member 154a, on the one surface 150a of the first barrier 150, may be provided to correspond to the thickness H4 of a lower first connection rib 156a of first connection ribs 156a provided to the other surface 150b of the second barrier 150. For example, in a case where the first and second barriers 150 are engaged with each other, the support portion 155 provided to the other surface 150b of the second barrier 150 may be mounted on the bottom flange portion 154 provided on the one surface 150a of the first barrier 150. Thus, the support portions 155 respectively provided to the first and second barriers 150 may be aligned at positions corresponding to each other. In addition, the holes 155a provided inside the respective support portions 155 may be provided to face each other.

The barrier 150 may further include a connection rib 156 configured to the support portions 155 (e.g., the first and second support portions) respectively provided at lower portions of the base portion 151. The connection rib 156 may include a pair of first connection ribs 156a provided in parallel to the bottom flange portion 154 to respectively connect the first and second support portions 155 provided at upper and lower portions of the first and second support portions 155, and a plurality of second ribs 156b configured to vertically connect the pair of first connection ribs 156a. The bottom surface of the battery cell 10 may also be mounted on the first connection rib 156a, and the first connection rib 156a may help distribute the load of the battery cell 10 concentrated on the support portions 155. The second connection ribs 156b extended from the pair of first connection ribs 156a may be provided between the pair of first connection ribs 156a to reinforce the strength of the first connection ribs 156a.

The first and second connection ribs 156a and 156b may be formed to have predetermined thicknesses. For example, the first and second connection ribs 156a and 156b may be formed to have the same thickness. Thus, the first and second connection ribs 156a and 156b may be connected to each other to be farmed in the shape of a ladder. The first and second connection ribs 156a and 156b may form rectangular concave space portions.

Referring to the one surface 150a of the barrier 150, from which the bottom flange portion 154 is protruded, the width S2 of the support portion 155 in the y-direction may be formed thicker than that S3 of the first connection rib 156a in the y-direction so that the support portion 155 firmly supports the battery cell 10. The width S2 of the support portion 155 in the y-direction may be formed narrower than that S1 of the bottom flange portion 154 except the first connection rib 156a in the y-direction, so that it may be possible to increase the area of the flow path of the heat exchange medium passing through the bottom surface of the battery cell 10. The hole 155a in the support portion 155 and the bottom spacing member 154 provided at the bottom of the support portion 155 may generate a differential pressure of the heat exchange medium and change the path of the heat exchange medium, so that the heat exchange medium is ascended between the battery cell 10 and the side flange portion 152. Thus, the heat exchange medium passing through the lower portion of the battery cell 10 may be discharged to the outside of the barrier 150.

Referring to FIG. 4, the heat exchange medium U1 flowed in the barrier 150 through the openings 152a and 152b of the side flange portion 152 may pass through the space between the battery cell 10 and the side flange portion 152, formed by the side rib 153 provided to the side flange portion 152 (U2). Subsequently, the heat exchange medium may perform a heat exchange with the bottom surface of the battery cell 10 while passing through the space at the bottom surface of the battery cell 10, formed by the support portion 155 (U3), and then pass along a side surface of the battery cell 10 (U4). The heat exchange medium may be discharged to the outside of the barrier 150 by passing through the openings 152a and 152b of the side flange portion 152.

Hereinafter, example embodiments will be described with reference to FIGS. 5 and 6. Details that are similar to those of the example embodiments described with reference to FIGS. 1 to 4 may not be repeated.

Figure 5:
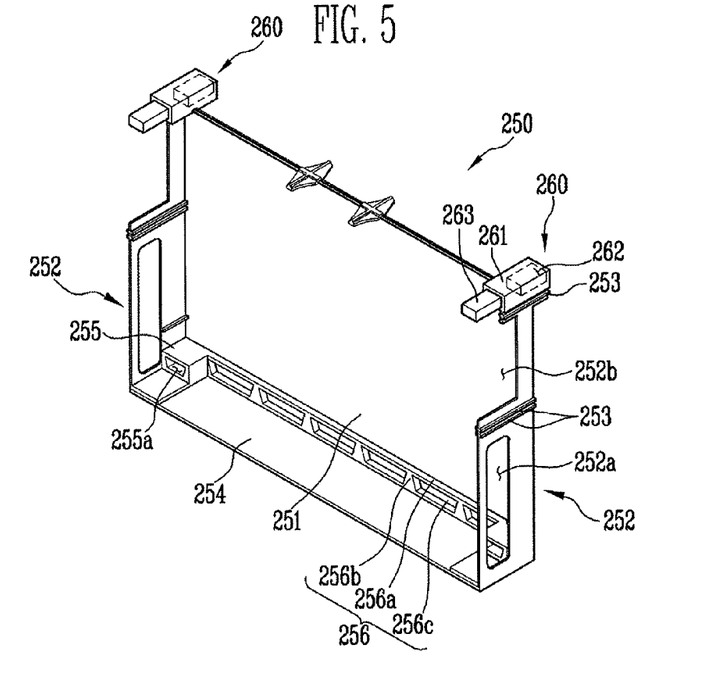
FIG. 5 illustrates a perspective view of a barrier according to an example embodiment.

FIG. 5 illustrates a perspective view of a barrier according to an example embodiment.

Referring to FIG. 5, the barrier 250 according to the present example embodiment may have one battery cell provided in a space formed between the barrier 250 and an adjacent barrier 250. Each barrier 250 may be provided with a fastening portion 260, so that the barriers 250 may be fastened and fixed to each other through the fastening portions 260. The adjacent barrier 250 and the battery cell may be provided to be spaced apart from each other, and the space between the adjacent barrier 250 and the battery cell may act as a flow path of the heat exchange medium.

The barrier 250 may include a base portion 251 interposed between the battery cells, and side flange portions 252 and a bottom flange portion 254 respectively provided at end portions of the base portion 251 to support side and bottom surfaces of the battery cell. The barrier 250 may be provided so that the configuration provided to one surface of the base portion 251 is different from that provided to the other surface opposite to the one surface of the base portion 251. For example, the side flange portions 252 and the bottom flange portion 254 may be provided to the one surface of the base portion 251. The side flange portions 252 and the bottom flange portion 254 may not be provided to the other surface of the base portion 251. The side flange portion 252 may be provided with openings 252a and 252b, which are passages through which the heat exchange medium is flowed in the barrier 250 or flowed out of the barrier 250, and side ribs 253 protruded from a surface of the side flange portion 252. A body portion 261 of the fastening portion 260 may be provided at a portion where a top portion of the side flange portion 252 and the base portion 251 meet each other. A fastening groove 262 and a fastening projection 263 may be respectively provided at one end and the other end of the body portion 261 of the fastening portion 260.

Support portions 255 configured to support the battery cell may be provided beneath the base portion 251. The support portions 255 may be respectively provided at one side and the other side of the base portion 251. The support portions 255 respectively provided at the one side and the other side of the base portion 251 may be connected by a connection rib 256. An upper first connection rib 256a may be provided to connect upper portions of the support portions 255, and a lower first connection rib 256c may be provided to connect lower portions of the support portions 255. Thus, the first connection ribs 256a and 256c may support, together with the support portions 255, the bottom surface of the battery cell.

The pair of first connection ribs 256a and 256c provided in parallel to each other may be connected by a plurality of second connection ribs 256b provided vertically to the first connection ribs 256a and 256c. For example, the thickness of the first connection ribs 256a and 256c may be formed constant without any change in thickness, and the second connection rib 256b may be formed to have a continuously changed thickness. Thus, the thickness of the second connection rib 255b may be gradually decreased as the second connection rib 256b reaches from the lower first connection rib 256c to the upper first connection rib 256a. Thus, the first and second connection ribs 256a, 256b, and 256c may be protruded on the base portion 251 to form trapezoid space portions inside the connection rib 256. The support portion 255 may be formed in the shape of a quadrangular box having a hole 255a therein. In this case, the hole 255a may be formed in a trapezoid shape. The support portion 255 and the connection rib 256 may support the load of the battery cell. The lower portion of the support portion 255 and the lower portion of the second connection rib 256b are formed thick, which may help strengthen the support portion 255 and the connection rib 256. Accordingly, the weight of the battery cell may be more efficiently supported.

Figure 6:
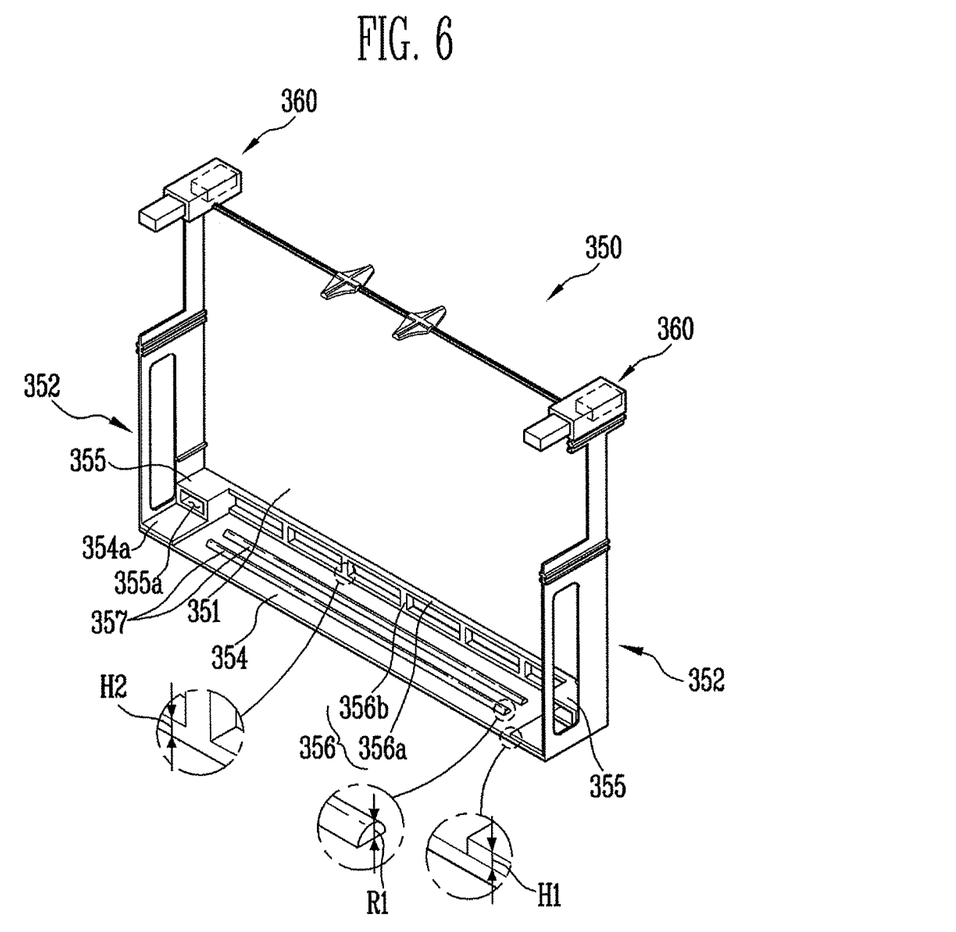
FIG. 6 illustrates a perspective view of a barrier according to an example embodiment.

FIG. 6 illustrates a perspective view of a barrier according to an example embodiment.

Referring to FIG. 6, the barrier 350 according to the present example embodiment may be interposed between adjacent battery cells in the battery module. The barrier 350 may include a base portion 351 provided to face a wide surface of the battery cell, and side flange portions 352 and a bottom flange portion 354, provided to face narrow surfaces (side and bottom surfaces) of the battery cell at each corner of the base portion 351.

The bottom flange portion 354 may include two support portions 355 configured to support the battery cell, and a connection rib 356 configured to connect the two support portions 355 to each other. The support portion 355 may be formed in the shape of a box having a hole 355a therein. The connection rib 35 may include a pair of first connection ribs 356a provided in parallel to connect the two support portions 255 to each other, and second connection ribs 356b configured to vertically connect the pair of first connection ribs 356a to each other. The bottom flange portion 354 may be further provided with a spacing member 354a on which the support portion 355 is mounted.

The barrier 350 may be provided with one or more guide portions 357 provided to the bottom flange portion 354 so as to guide the flow of a heat exchange medium. The guide portion 357 may be protruded toward the bottom surface of the battery cell on the bottom flange portion 354. The guide portion 357 may be extended along the length direction of the bottom flange portion 354. The guide portion 354 may be provided so that the corner of the guide portion 354 is rounded. The section of the guide portion 354 in a direction vertical to the extending direction of the guide portion 354 may be formed in a semicircular shape. The height R1 of the guide portion 354 may be formed equal to or smaller than the thickness H2 of a lower first connection rib 356a of the first connection ribs 356a or the thickness H1 of the spacing member 354a.

A flow path of the heat exchange medium heat-exchanged with the battery cell may be provided in the harrier 350 according to the present example embodiment. For example, the flow path of the heat exchange medium may also be provided between the bottom flange portion 354 and the bottom surface of the battery cell. The guide portion 357 may be provided on the bottom flange portion so that the flow of the heat exchange medium can be guided, which may improve the heat exchange efficiency between the heat exchange medium and the battery cell. According to the present example embodiment, the height R1 of the guide portion 357 is provided to correspond to the thickness H2 of the lower first connection rib 356a provided to the bottom flange portion 354 or the thickness H1 of the spacing member 354a. Thus, the guide portion 357 guides only the flow of the heat exchange medium but does not interfere with the flow of the heat exchange medium in the width direction of the bottom flange portion 354.

By way of summation and review, an electrochemical reaction occurs inside a battery cell, and heat is generated with the reaction. The heat generated may degrade the battery cell and deteriorated characteristics including the capacity of the battery cell, etc. In a high-capacity battery cell, the generated heat is further increased. In a battery module configured with a set of the battery cells, the safety of the battery module may be a concern.

As described above, embodiments provide a battery module having a barrier. The battery module may be capable of improving the heat exchange efficiency of a battery cell.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A battery module, comprising:
   a first battery cell;
   a first barrier; and
   a second barrier, the first battery cell being between the first barrier and the second barrier,
   wherein a first opening is in flow communication with a first space defined between a first side of the first battery cell and a first side portion formed by at least one of the first and second barriers to provide a first flow path for a heat exchange medium, the first space being in flow communication with a second space defined between a second side of the first battery cell and a second side portion formed by at least one of the first and second barriers, to provide a second flow path for the heat exchange medium in flow communication with the first flow path, the second flow path being in a different direction from the first flow path.

2. The battery module as claimed in claim 1, wherein the second space is in flow communication with a third space defined between a third side of the first battery cell and a third side portion formed by at least one of the first and second barriers.

3. The battery module as claimed in claim 1, wherein the first and second barriers each include a base portion, and bottom and side flange portions extending from bottom and side edges of the base portion.

4. The battery module as claimed in claim 3, wherein:
the first side portion includes the side flange portion of one of the first and second barriers, and
the second side portion includes the bottom flange portion of one of the first and second barriers.

5. The battery module as claimed in claim 3, wherein:
the second side portion is formed by the base portion of the one of the first and second barriers and the bottom flange portion of the other of the first and second barriers,
the first opening exposes the first side of the first battery cell, and
the second space is in flow communication with a second opening at a third side of the first battery cell.

6. The battery module as claimed in claim 5, wherein the battery module is configured to pass a heat exchange medium from the first opening to the second opening.

7. The battery module as claimed in claim 3, wherein the bottom flange portion includes one or more guide portions located on and protruding from an inner surface of the bottom flange portion toward the bottom surface of the first battery cell that extends along a length direction of the bottom flange portion, and is configured to guide the heat exchange medium.

8. The battery module as claimed in claim 3, further comprising a second battery cell and a third barrier, the second battery cell being between the first barrier and the third barrier, wherein the base portion of the first barrier is interposed between the first battery cell and the second battery cell.

9. The battery module as claimed in claim 3, wherein the side flange portions of at least one of the first and second barriers include side ribs located on and protruding from inner surfaces of the side flange portions toward the first battery cell.

10. The battery module as claimed in claim 3, wherein the first opening is formed in the side flange portion of one of the first and second barriers.

11. The battery module as claimed in claim 10, wherein a second opening is formed in another side flange portion of the one of the first and second barriers having the first opening formed therein.

12. The battery module as claimed in claim 3, wherein at least one of the first and second barriers includes a support portion that contacts the base portion, the bottom flange portion, and the side flange portion, and is configured to support the first battery cell, the support portion defining at least part of the second space.

13. The battery module as claimed in claim 1, wherein at least one of the first and second barriers includes a fastening portion coupling the first and second barriers together.

14. The battery module as claimed in claim 13, wherein the fastening portion includes a projecting member that connects with an adjacent barrier.

15. The battery module as claimed in claim 13, wherein the fastening portion is disposed at an upper portion of the barriers.

16. The battery module as claimed in claim 15, wherein the fastening portion includes a body portion having a projecting member and a fastening groove, the projecting member projecting from a first side of the body portion, the fastening groove being provided at an opposite side of the body portion.

17. The battery module as claimed in claim 16, wherein the projecting member of one of the first and second barriers is coupled with the fastening groove of the other of the first and second barriers.

* * * * *